(12) United States Patent
Sakamoto

(10) Patent No.: US 8,584,723 B2
(45) Date of Patent: Nov. 19, 2013

(54) PNEUMATIC TIRE AND PRODUCING METHOD THEREOF

(75) Inventor: Masayuki Sakamoto, Hyogo (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 335 days.

(21) Appl. No.: 13/139,214

(22) PCT Filed: Nov. 24, 2009

(86) PCT No.: PCT/JP2009/069772
§ 371 (c)(1),
(2), (4) Date: Jun. 10, 2011

(87) PCT Pub. No.: WO2010/067699
PCT Pub. Date: Jun. 17, 2010

(65) Prior Publication Data
US 2011/0240191 A1    Oct. 6, 2011

(30) Foreign Application Priority Data
Dec. 12, 2008  (JP) .................................. 2008-317255

(51) Int. Cl.
*B60C 9/20*    (2006.01)
*B60C 11/00*   (2006.01)

(52) U.S. Cl.
USPC ........ 152/209.2; 152/526; 152/536; 152/538; 156/123

(58) Field of Classification Search
USPC ................... 152/209.2, 209.3, 526, 536, 538; 156/123
See application file for complete search history.

(56) References Cited

U.S. PATENT DOCUMENTS

| 6,116,311 A | 9/2000 | Ueyoko et al. |
| 6,615,887 B2 * | 9/2003 | Denoueix et al. .......... 152/209.5 |
| 2006/0011399 A1 | 1/2006 | Ohara |
| 2010/0024949 A1 * | 2/2010 | Mancini et al. ............... 152/558 |

FOREIGN PATENT DOCUMENTS

| EP | 0166154 | * | 1/1986 |
| JP | 11-20407 A | | 1/1999 |
| JP | 2003-2011 A | | 1/2003 |
| JP | 2003-2012 A | | 1/2003 |
| JP | 2006-44469 A | | 2/2006 |

(Continued)

OTHER PUBLICATIONS

English machine translation of JP2006-312419, dated Nov. 2006.*

(Continued)

*Primary Examiner* — Steven D Maki
*Assistant Examiner* — Robert Dye
(74) *Attorney, Agent, or Firm* — Birch, Stewart, Kolasch & Birch, LLP

(57) ABSTRACT

The present invention enhances noise performance and anti-uneven wear performance. A pneumatic tire 1 includes a belt layer 7 including at least one belt ply in which belt cords 15 are arranged at an angle of 10 to 40° with respect to a tire equator C. A tread pattern formed on a surface of the tread portion 2 includes a pitch line 22 in which at least two kinds of pattern-constituting units 21 having different pitches in a circumferential direction of the tire are arranged in the circumferential direction of the tire. The belt cords 15 are arranged relatively densely on an inner side of the pattern-constituting unit 21 having a small pitch, and relatively thinly on an inner side of the pattern-constituting unit 21 having a large pitch.

8 Claims, 13 Drawing Sheets

(56) References Cited

FOREIGN PATENT DOCUMENTS

| | | | |
|---|---|---|---|
| JP | 2006-176079 A | | 7/2006 |
| JP | 2006-312419 | * | 11/2006 |
| JP | 2008-18754 A | | 1/2008 |
| JP | 2008-290609 | * | 12/2008 |

OTHER PUBLICATIONS

English machine translation of JP2008-290609, dated Dec. 2008.*
International Search Report, dated Feb. 9, 2010, issued in PCT/JP2009/069772.

* cited by examiner

US 8,584,723 B2

PNEUMATIC TIRE AND PRODUCING METHOD THEREOF

TECHNICAL FIELD

The present invention relates to a pneumatic tire capable of enhancing noise performance and enhancing anti-uneven wear performance, and the invention also relates to a producing method of the pneumatic tire.

BACKGROUND ART

There is known a pneumatic tire having a tread pattern of a so-called pitch variation in which a plurality of kinds of pattern-constituting units having different pitches (e.g., one lateral groove and one block which is adjacent to the lateral groove) in a circumferential direction of the tire are arranged at random in the tire circumferential direction (see Patent Document 1, for example). The tire of this kind disperses, in a wide range, frequency of pitch noise generated when a tread portion repeatedly comes into contact with a road surface during running, thereby enhancing the noise performance.
[Patent Document 1] Japanese Patent Application Publication No. 2006-176079

DISCLOSURE OF THE INVENTION

Technical Problems to be Solved

In such a tread pattern, however, rigidity becomes high in the pattern-constituting unit having a large pitch, and low in the pattern-constituting unit having a small pitch. Therefore, there is a problem that rigidity of the tread pattern is not uniform in the tire circumferential direction, and uneven wear is prone to be generated in the pattern-constituting unit of a pitch having low rigidity.

The present invention has been accomplished in view of the above circumstances. A tread pattern includes pitch lines formed by at least two kinds of pattern-constituting units which have different pitches in the tire circumferential direction, arranging density of belt cords arranged in a tread portion is set dense on an inner side of a pattern-constituting unit having a small pitch, and is set thin on an inner side of a pattern-constituting unit having a large pitch. With this configuration, it is a main object of the present invention to provide a pneumatic tire capable of enhancing noise performance and anti-uneven wear performance, and to provide a producing method of the pneumatic tire.

Means to Solve the Problems

An invention of claim 1 of the present invention provides a pneumatic tire including a toroidal carcass extending from a tread portion to a bead core of a bead portion through a side wall portion, and a belt layer having at least one belt ply which is disposed on an outer side of the carcass in a radial direction of the tire and inside of the tread portion, in which belt cords are arranged at an angle of 10 to 40° with respect to a tire equator, wherein a tread pattern formed on a surface of the tread portion includes a pitch line in which at least two kinds of pattern-constituting units having different pitches in a circumferential direction of the tire are arranged in the circumferential direction of the tire, and the belt cords are arranged relatively densely on an inner side of the pattern-constituting unit having a small pitch, and are arranged relatively thinly on an inner side of the pattern-constituting unit having a large pitch.

According to an invention of claim 2, in the pneumatic tire of claim 1, the pitch line is arranged on the tire equator.

According to an invention of claim 3, in the pneumatic tire of claim 1, the pitch line is arranged on a side closest to a ground-contact end.

According to an invention of claim 4, in the pneumatic tire of claim 3, the tread portion includes a tread pattern having a directivity in which a mounting direction thereof with respect to a vehicle is specified, and the pitch line is located on the outer side of the vehicle when the pneumatic tire is mounted to the vehicle.

According to an invention of claim 5, in the pneumatic tire of any one of claims 1 to 4, the pitch line is a block line in which the pattern-constituting units consisting of one lateral groove and one block which is adjacent to the lateral groove on one side of the lateral groove in the circumferential direction of the tire are arranged.

According to an invention of claim 6, in the pneumatic tire of any one of claims 1 to 4, the pitch line is a land line in which the pattern-constituting units consisting of one lug groove and one land portion sandwiched between the lug grooves are arranged.

According to an invention of claim 7, in the pneumatic tire of any one of claims 1 to 6, a ratio (NL/NS) of an arranging density NL on an inner side of the pattern-constituting unit having the smallest pitch and an arranging density NS on an inner side of the pattern-constituting unit having the largest pitch is 1.20 to 2.00.

An invention of claim 8 provides a producing method of the pneumatic tire according to any one of claims 1 to 7, including a green tire forming step of forming a non-vulcanized green tire using a core for forming an annular green tire, and a vulcanizing step of vulcanizing the green tire by a vulcanizing mold having a forming surface in which the tread pattern is reversed, wherein the green tire forming step includes a step of forming the belt ply while arranging, in a circumferential direction of the tire, at least two kinds of strip-like belt ply pieces having different arranging densities of the belt cords, and in the vulcanizing step, a forming surface which forms the pattern-constituting unit having a large pitch on an outer side of the strip-like belt ply piece having a small arranging density, and a forming surface which forms the pattern-constituting unit having a small pitch on an outer side of the strip-like belt ply piece having a large arranging density are positioned and vulcanized.

unless otherwise specified, sizes of the various portion of the tire are values specified in a normal state where the tire is mounted around a normal rim, normal internal pressure is charged into the tire, and no load is applied to the tire. The "normal rim" is a rim determined for each tire by a specification standard including a specification on which the tire is based, and is a "Standard Rim" specified in JATMA, a "Design Rim" in TRA, and a "Measuring Rim" in ETRTO.

The "normal internal pressure" is air pressure determined for each tire by a specification standard including a specification on which the tire is based, and is "maximum air pressure" in JATMA, the maximum value described in a Table "TIRE LOAD LIMITS AT VARIOUS COLD INFLATION PRESSURES" in TRA, and "INFLATION PRESSURE" in ETRTO.

The "ground-contact end" is a ground-contact end when normal pressure is applied to a tire in the normal state and the tire is brought into contact with a flat surface.

Further, the "normal load" is a load determined for each tire by a specification standard including a specification on which the tire is based, and is a "maximum load ability" in JATMA, the maximum value described in the Table "TIRE LOAD LIMITS AT VARIOUS COLD INFLATION PRESSURES" in TRA, and a "LOAD CAPACITY" in ETRTO. When the tire is for a passenger vehicle, the normal load is 88% of the above load.

Effect of the Invention

According to the pneumatic tire of the invention, a tread pattern formed on a surface of a tread portion includes pitch lines in which at least two kinds of pattern-constituting units having different pitches in the tire circumferential direction are arranged in the tire circumferential direction. With this configuration, it is possible to disperse frequency of noise in a wide range, thereby enhancing the noise performance.

The arranging density of belt cords of the belt ply disposed in the tread portion is set relatively dense on the inner side of the pattern-constituting unit having the small pitch, and relatively thin on the inner side of the pattern-constituting unit having the large pitch. With this arrangement of the belt cords, the rigidity of the pattern-constituting unit having the small pitch can be enhanced compared to that of the pattern-constituting unit having the large pitch. Therefore, it is possible to uniformize the rigidity in the tire circumferential direction in the pitch line, and to enhance the anti-uneven wear performance.

BRIEF DESCRIPTION OF NUMERALS

Figure 1:
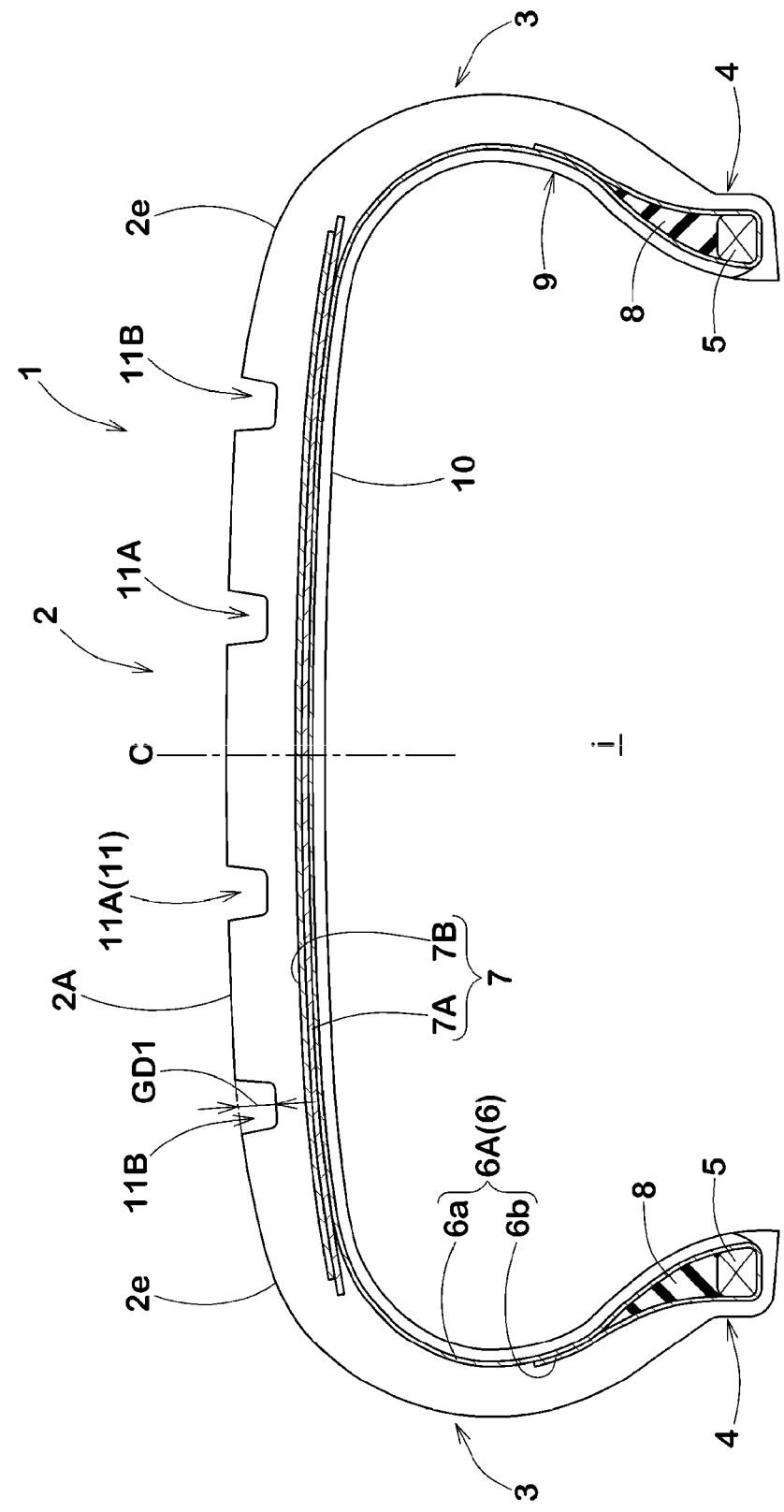
FIG. 1 is a cross sectional view showing an embodiment of a pneumatic tire of the present invention.

1 Pneumatic tire
2 Tread portion
7 Belt layer
15 Belt cord

21 Pattern-constituting unit
22 Pitch line

BEST MODE FOR CARRYING OUT THE INVENTION

An embodiment of the present invention will be described with reference to the drawings.

As shown in FIG. 1, a pneumatic tire (hereinafter also referred to simply as "tire") 1 of this embodiment includes a carcass 6 extending from a tread portion 2 to bead cores 5 of bead portions 4 through side wall portions 3, and a belt layer 7 disposed on an outer side of the carcass 6 in a radial direction of the tire and on an inner side of the tread portion 2. In this embodiment, the pneumatic tire 1 is a radial tire for a passenger vehicle.

The carcass 6 is formed from one or more (one in this embodiment) carcass ply 6A of a radial structure in which a carcass cord is arranged at an angle, for example, of 80 to 90° with respect to a tire equator C. As the carcass cord, an organic fiber cord made of polyester, nylon, rayon, or aramid is employed. Alternatively, a steel cord may be employed if required.

The carcass ply 6A includes a body portion 6a extending from the tread portion 2 to the bead core 5 of the bead portion 4 through the side wall portion 3, and a folded-back portion 6b extending from the body portion 6a and folded back outward from inward in an axial direction of the tire around the bead core 5. A bead apex 8 made of hard rubber is disposed between the body portion 6a and the folded-back portion 6b of the carcass ply 6A. The bead apex 8 extends from the bead core 5 outward in the tire radial direction, and the bead portion 4 is appropriately reinforced. An air non-permeable inner liner rubber 9 is disposed on an inner surface of the carcass 6.

The belt layer 7 includes at least one belt ply (in this embodiment, two inner and outer belt plies 7A and 7B in the tire radial direction) in which belt cords 15 (shown in FIG. 4) are arranged at a small angle of 10 to 40° with respect to a tire equator C. The belt plies 7A and 7B are superposed on each other while changing their orientations from each other so that the belt cords 15 intersect with each other between the plies. A steel cord is preferably used as the belt cord 15, but it is also possible to use a high elastic organic fiber cord such as aramid and rayon as required.

Figure 2:
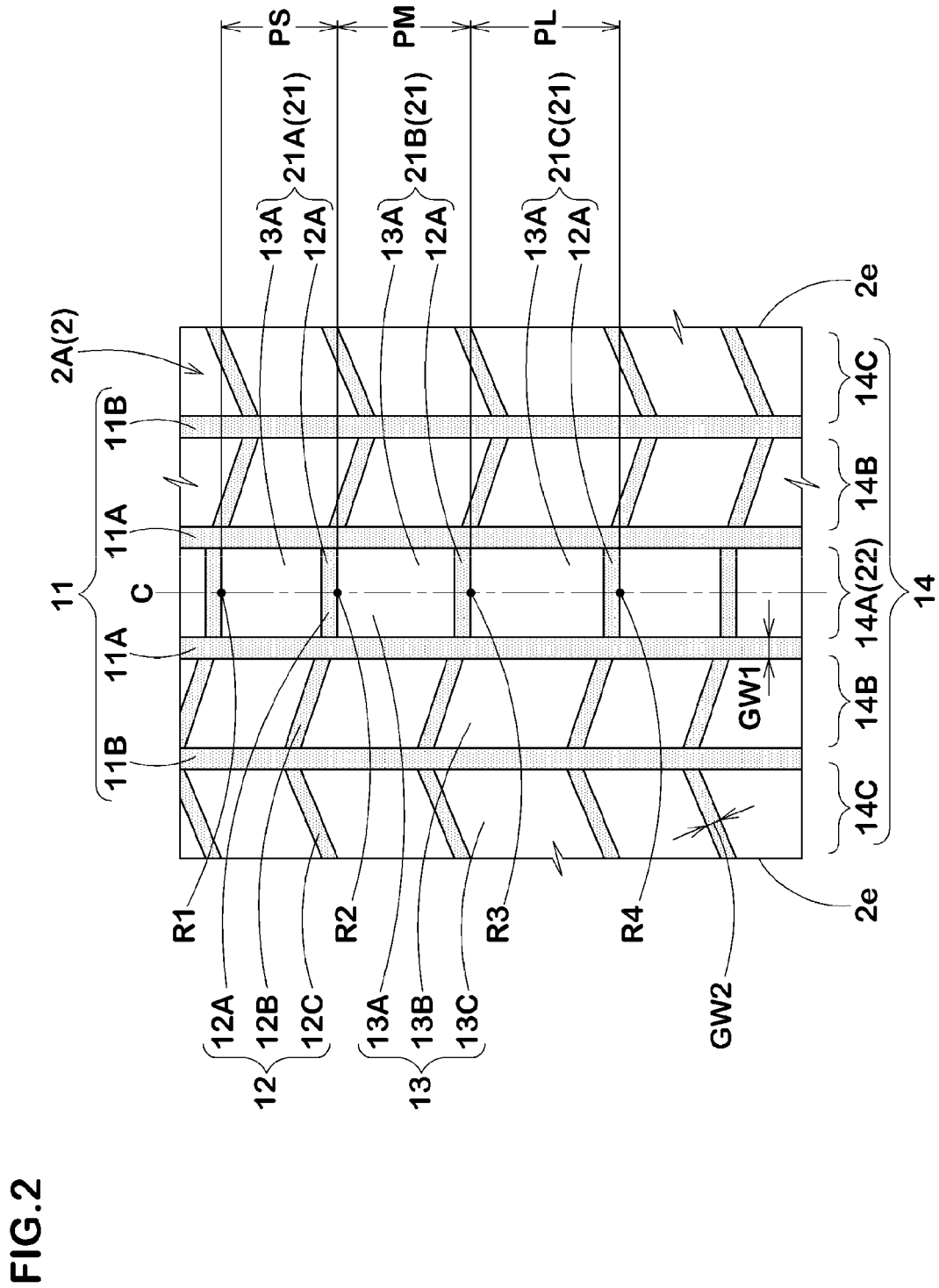
FIG. 2 is a plan view showing a tread pattern of FIG. 1.

FIG. 2 is a development view of the tread portion 2 of the tire 1 of this embodiment.

Tread patterns formed on a surface of the tread portion 2 and between ground-contact ends 2e and 2e are formed such that the tread patterns include pitch lines 22 in which at least two kinds of pattern-constituting units 21A to 21C (when the pattern-constituting units are collectively referred to, a symbol "21" is used) having different pitches in the tire circumferential direction are arranged in the tire circumferential direction.

In this embodiment, each of the pattern-constituting units 21 consists of one lateral groove 12 and one block 13 which is located adjacent to one side of the lateral groove 12 in the tire circumferential direction. Such pattern-constituting units 21 are repeatedly arranged in the tire circumferential direction, and then a block pattern in which a plurality of block lines 14 is formed is formed in the tread portion 2.

In this embodiment, main grooves 11 include a pair of inner main grooves 11A and 11A which are disposed on a side closest to the tire equator C and which extend along both sides of the tire equator C, and a pair of outer main grooves 11B and 11B extending along outer sides of the main grooves 11A and 11A. The main grooves 11A and 11B extend linearly along the tire circumferential direction, but they may extend nonlinearly in a zigzag form or a corrugated form. In order to maintain pattern rigidity while securing sufficient draining performance, it is preferable that a groove width GW1 of each of the main grooves 11A and 11B is 5.0 to 15.0 mm, and a groove depth GD1 (shown in FIG. 1) thereof is 5.0 to 15.0 mm.

In this embodiment, the lateral grooves 12 includes inner lateral grooves 12A which connect the inner main grooves 11A and 11A, intermediate lateral grooves 12B which connect the inner main groove 11A and the outer main groove 11B, and outer lateral grooves 12C which extend between the outer main groove 11B and the ground-contact end 2e. In order to maintain pattern rigidity while securing sufficient draining performance, it is preferable that a groove width GW2 of each of the lateral grooves 12A, 12B, and 12C is 2.0 to 10.0 mm, and a groove depth GD2 (shown in FIG. 4) thereof is 1.0 to 10.0 mm.

The block lines 14 include a center block line 14A in which center blocks 13A defined between the inner main grooves 11A and 11A are arranged in the tire circumferential direction, a pair of shoulder block lines 14C in each of which shoulder blocks 13C defined between the outer main groove 11B and the ground-contact end 2e are arranged in the tire circumferential direction, and a pair of middle block lines 14B in each of which middle blocks 13B defined between the inner main groove 11A and the outer main groove 11B are arranged in the tire circumferential direction.

The center block line 14A of this embodiment is formed as a pitch line 22 of a so-called variable pitch in which three kinds of pattern-constituting units 21 having different pitches PS, PM, and PL (PS<PM<PL) in the tire circumferential direction are arranged in the tire circumferential direction. The pattern-constituting units 21 consist of a small pattern-constituting unit 21A having the smallest pitch PS, a large pattern-constituting unit 21C having the largest pitch PL, and an intermediate pattern-constituting unit 21B having a pitch PM which is intermediate between PS and PL. Such pitch line 22 is of help to disperse frequency of pitch noise in a wide range, and to enhance the noise performance. Especially it is preferable that the pitches PS, PM, and PL are arranged at random. Such a pitch variation method may be applied to all of the block lines 14. That is, each of the block lines 14A, 14B, and 14C can be formed as the pitch line 22 as in this embodiment.

When only one pitch line 22 is formed on the tread portion 2 in the pneumatic tire 1, in the pitch line 22, the belt cords 15 are arranged densely on the inner side of the pattern-constituting unit 21 having the small pitch PS, and the belt cords 15 are arranged thinly on the inner side of the pattern-constituting unit 21 having the large pitch PL. The terms "densely" and "thinly" are used as relative expressions. When a plurality of pitch lines 22 are formed on the tread portion 2, in one pitch line 22 selected from the plurality of the pitch lines 22, the belt cords 15 are arranged densely on the inner side of the pattern-constituting unit 21 having the small pitch PS, and the belt cords 15 are arranged thinly on the inner side of the pattern-constituting unit 21 having the large pitch PL. The terms "densely" and "thinly" are used as relative expressions.

In this embodiment, in the center block line 14A which is one of the plurality of pitch lines 22, the belt cords 15 are arranged densely on the inner side of the pattern-constituting unit 21 having the small pitch PS, and the belt cords 15 are arranged thinly on the inner side of the pattern-constituting unit 21 having the large pitch PL. Such an arrangement of the belt cords 15 makes it possible to enhance the rigidity of the small pattern-constituting unit 21A which originally has small rigidity in the tire circumferential direction. Therefore, in the center block line 14A, the rigidity in the tire circumferential direction is uniformized, and wear of each center block 13A is also uniformized. With such a tread pattern, the grip on road surface can be exerted uniformly, therefore the tread pattern is of help to enhance traction performance.

Figure 3:
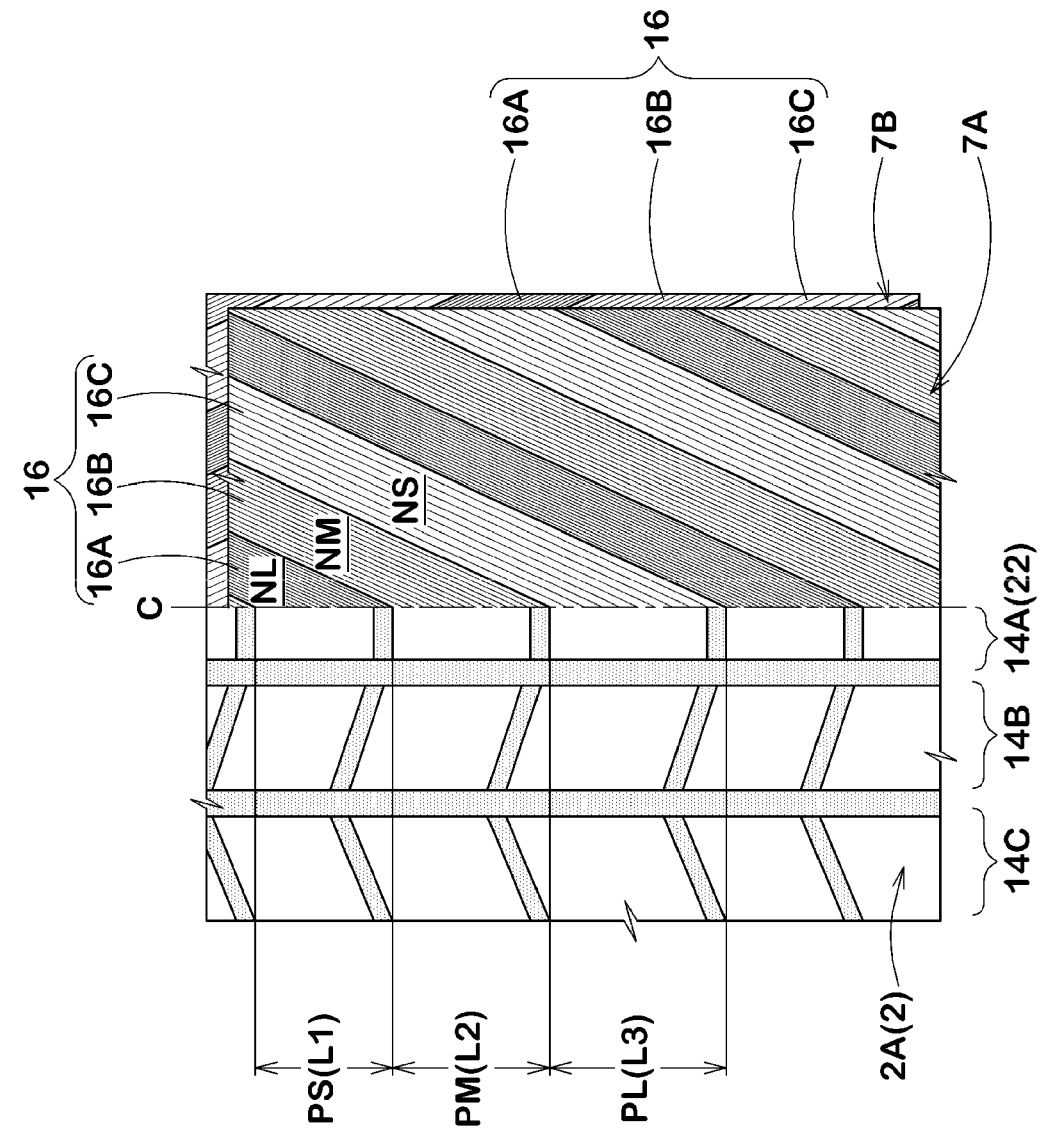
FIG. 3 is a development view of a tread portion 2 of FIG. 2 from which a right half of the tread pattern is removed.
Figure 4:
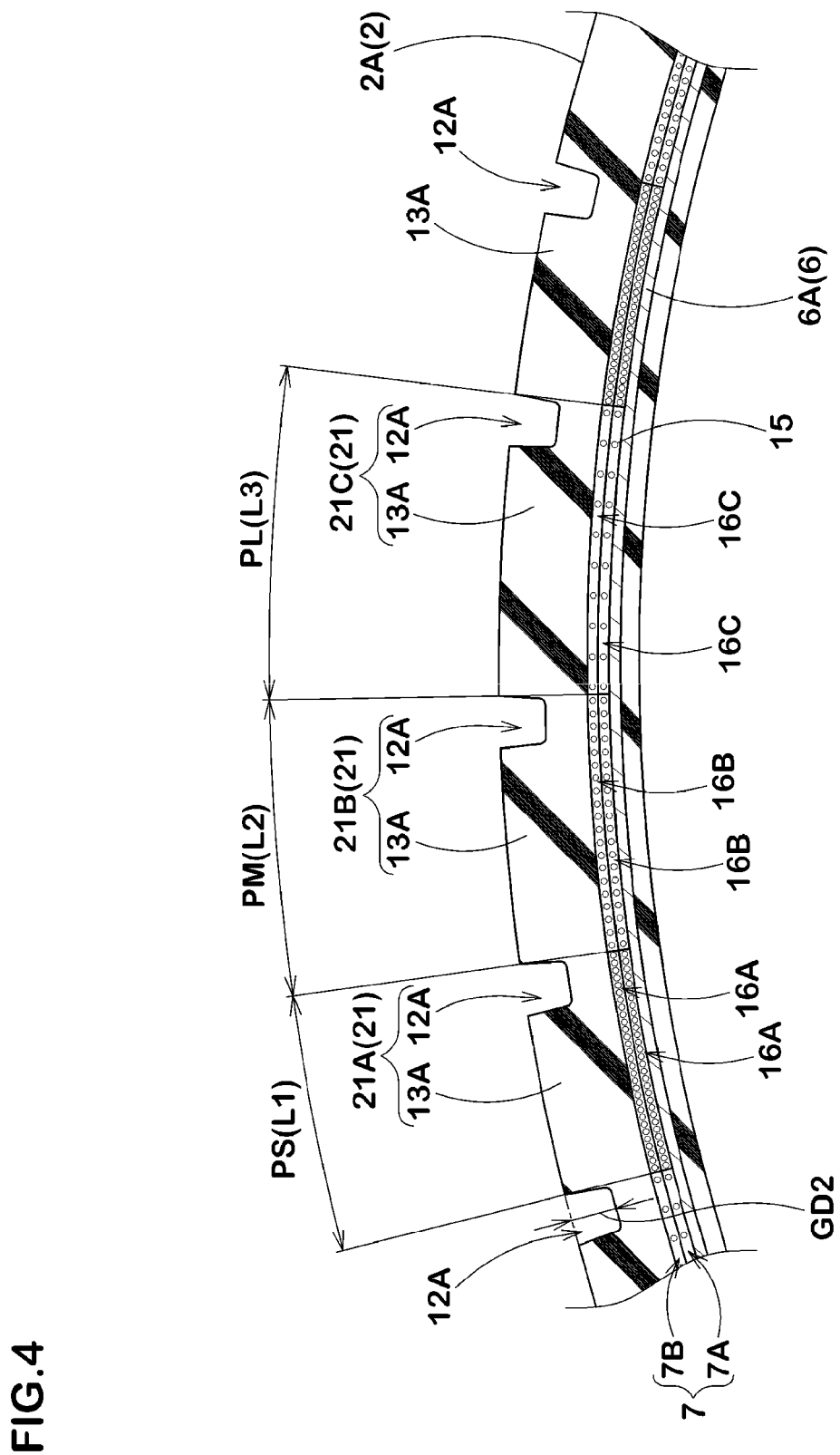
FIG. 4 is a cross sectional view of the tread portion obtained by cutting the tire of FIG. 1 along a tire equator.

FIG. 3 is a development view of the tread portion 2 of FIG. 2 from which a right half of the tread pattern is removed. FIG. 4 is a cross sectional view of the tread portion obtained by cutting the tire along the tire equator. As shown in FIGS. 3 and 4, the belt plies 7A and 7B of this embodiment have three kinds of cord arranging portions having different arranging densities NL, NM, and NS (NL>NM>NS) of the belt cords 15. That is, the cord arranging portions of the belt cord 15 include a densely arranging portion 16A having the largest arranging density NL, a thinly arranging portion 16C having the smallest arranging density NS, and an intermediate densely arranging portion 16B having an arranging density NM which is intermediate between the NL and NS.

In this embodiment, in the center block line 14A (pitch line 22), the densely arranging portion 16A is formed on the inner side of the small pattern-constituting unit 21A, the thinly arranging portion 16C is formed on the inner side of the large pattern-constituting unit 21C, and the intermediate densely arranging portion 16B is formed on the inner side of the intermediate pattern-constituting unit 21B.

It is preferable that a relationship between the arranging density of the belt cord 15 and the pitches PS, PM, and PL of the pitch lines 22 is determined on the basis of positions of center lines of widths of the pitch lines 22. Such a reference position typically reflects rigidity of the pitch line 22. Therefore, in the center block line 14A, the belt cords 15 are arranged densely on the inner side of the pattern-constituting unit 21 having the small pitch PS, and thinly on the inner side of the pattern-constituting unit 21 having the large pitch PL on the basis of the position of the tire equator C which is a center of the width of the center block line 14A. The arranging density of the belt cords is also specified by a length of the pitch in the tire circumferential direction in the reference position (tire equator C in the case of the center block line 14) and the number of belt cords arranged therein.

More preferably, at the position of the tire equator C as shown in FIG. 3, lengths L1, L2, and L3 of the densely arranging portion 16A, the intermediate densely arranging portion 16B, and the thinly arranging portion 16C in the tire circumferential direction are substantially the same as the pitches PS, PM, and PL. Therefore, rigidity of the blocks in the center block line 14A is more uniformized.

A ratio of the arranging density NL of the densely arranging portion 16A and the arranging density NS of the thinly arranging portion 16C is not especially limited. However, if the ratio is too great, there is a possibility that rigidity of the small pattern-constituting unit 21A is excessively increased, or rigidity of the large pattern-constituting unit 21C is excessively reduced. If the ratio is too small on the other hand, there is a possibility that the rigidity of the small pattern-constituting unit 21A is reduced or the rigidity of the large pattern-constituting unit 21C is excessively increased. From this viewpoint, the ratio (NL/NS) is preferably 1.20 or more, more preferably 1.40 or more, still more preferably 1.45 or more, and also preferably 2.00 or less, and more preferably 1.80 or less.

The arrangement of the belt cords 15 may be applied to at least one of the belt plies 7A and 7B, but it is preferable that the arrangement is applied to the belt ply 7B disposed radially outward of the tire.

Figure 5:
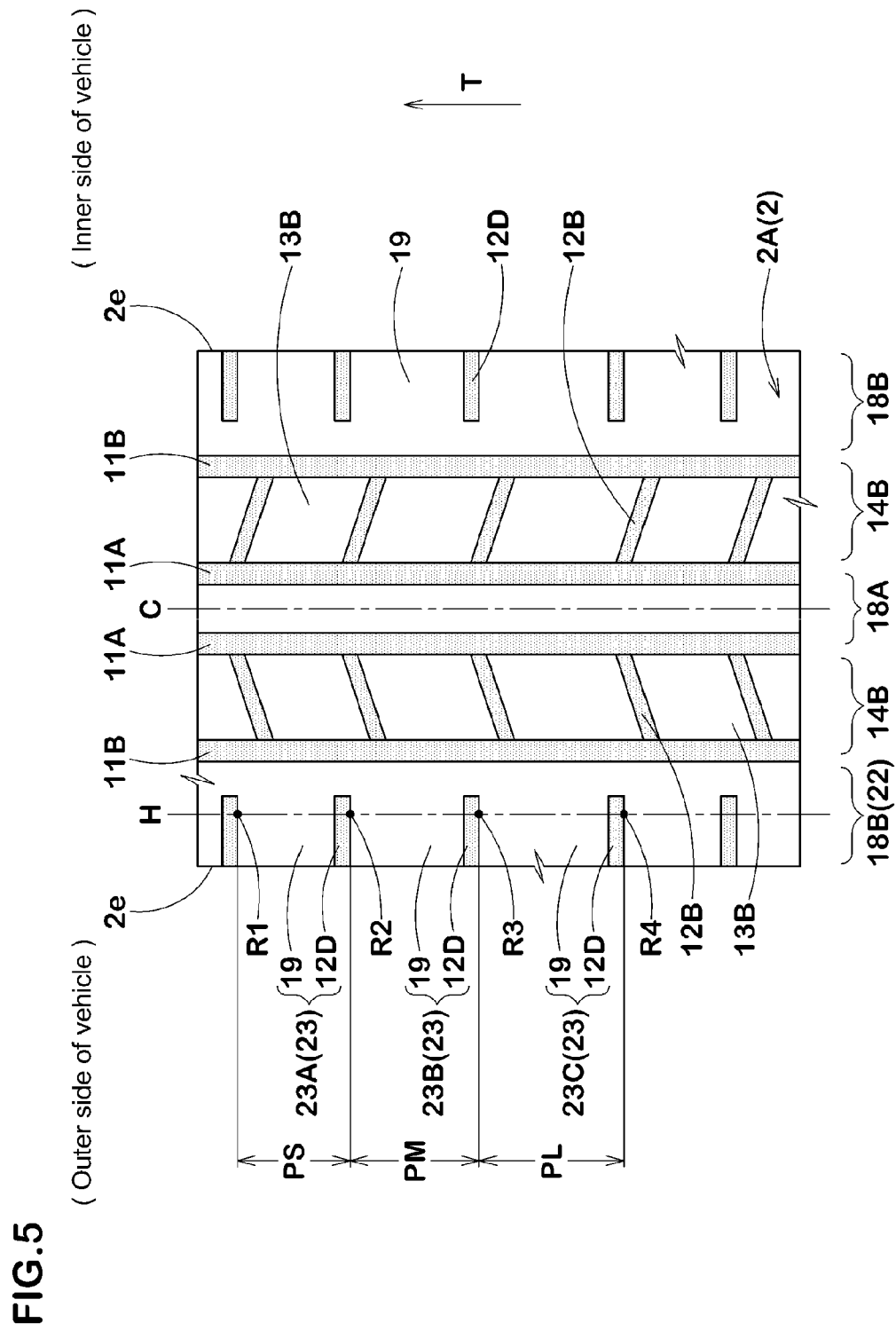
FIG. 5 is a plan view showing a tread pattern of a pneumatic tire according to another embodiment.
Figure 6:
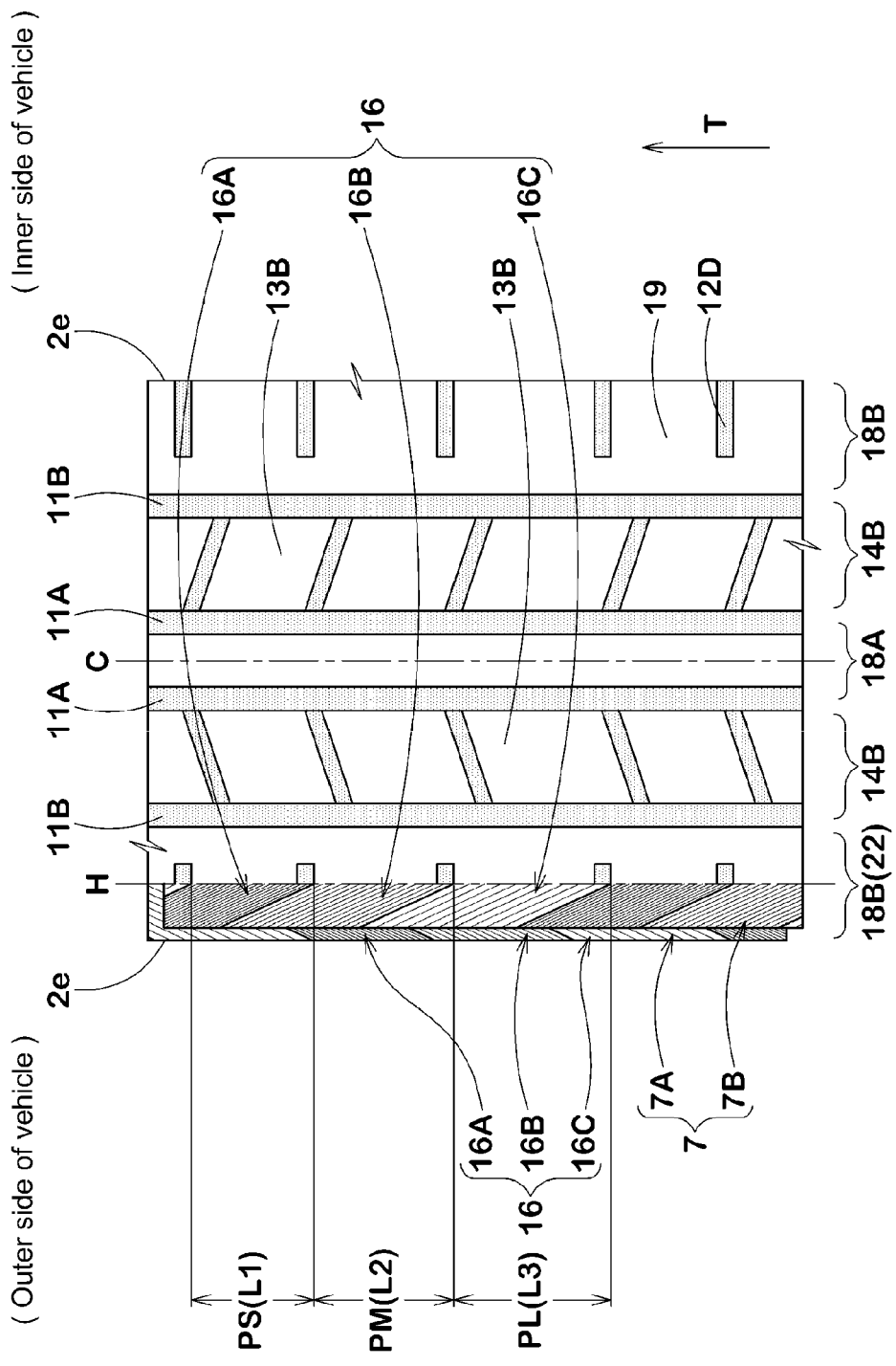
FIG. 6 is a development view showing a tread pattern and a belt layer of FIG. 5.

FIGS. 5 and 6 show another embodiment of the present invention.

In the first embodiment, dense and thin arrangement of the belt cords is applied to the center block line 14A of the plurality of pitch lines 22. Alternatively, as in the following second embodiment, the dense and thin arrangement of the belt cords 15 may be applied to the pitch lines 22 which are land lines 18B on the sides of shoulders of the plurality of pitch lines 22.

According to the second embodiment, land lines 18B are disposed on sides closest to the ground-contact ends 2e, a rib 18A is formed on a central portion of the tread portion 2, and a pair of middle block lines 14B are formed on both sides of the rib 18A. The pitch variation method is applied to the land lines 18B on the sides of the shoulders and to the middle block lines 14B, and they form the pitch lines 22.

The land line 18B on the side of the shoulder which is a selected pitch line 22 is formed of a pattern-constituting unit 23 which consists of one of lug grooves 12D, and one land portion 19 sandwiched between the lug grooves 12D and 12D. The lug groove 12D extends axially inward of the tire from the ground-contact end 2e, and terminates before the outer main groove 11B without reaching the outer main groove 11B.

The land line 18B on the side of the shoulder is formed as the pitch line 22 in which three kinds of pattern-constituting units 23A to 23C having different pitches PS, PM, and PL (PS<PM<PL) in the tire circumferential direction are arranged in the tire circumferential direction. As shown in FIG. 6, in the pitch line 22 (land line 18B), the belt cords 15 are densely arranged on the inner side of the pattern-constituting unit 23 having the small pitch PS, and the belt cords 15 are thinly arranged on the inner side of the pattern-constituting unit 23 having the large pitch PL. That is, the densely arranging portion 16A is formed on the inner side of the small pattern-constituting unit 23A, the thinly arranging portion 16C is formed on the inner side of the large pattern-constituting unit 23C, and the intermediate densely arranging portion 16B is formed on the inner side of the intermediate pattern-constituting unit 23B.

The land line 18B on the side of the shoulder receives a large lateral force when turning. Especially in the case of a tire for a truck or a bus to which a large load is applied, the land line 18B is outstandingly unevenly worn. Therefore, in such a tire, if the dense and thin arrangement of the belt cords 15 is applied to the land line 18B on the side of the shoulder, it is possible to disperse the noise performance, and to effectively suppress the most outstanding uneven wear.

The arranging density of the belt cords 15 in the second embodiment is determined on the basis of the center line H of the width of the land line 18B in the tire axial direction as described above.

In the case of a directional tread pattern in which mounting orientation of the tread pattern with respect to a vehicle and a tire rotation direction T are specified, it is preferable to select the land line 18B on the side of the shoulder on the outer side of the vehicle when the tire is mounted to the vehicle as the pitch line 22 to which the dense and thin arrangement of the belt cords 15 is applied. Since the land line on the outer side of the vehicle receives a large lateral force when turning, an effect of enhancing the anti-uneven wear performance can further be exerted.

When a plurality of pitch lines 22 are formed as described above, a pitch line 22 to which the dense and thin arrangement of the belt cords 15 is applied can be selected in accordance with a category of a tire.

Next, one example of the producing method of the pneumatic tire 1 will be described with reference to the tire of the block pattern shown in FIGS. 1 to 4.

Figure 7:
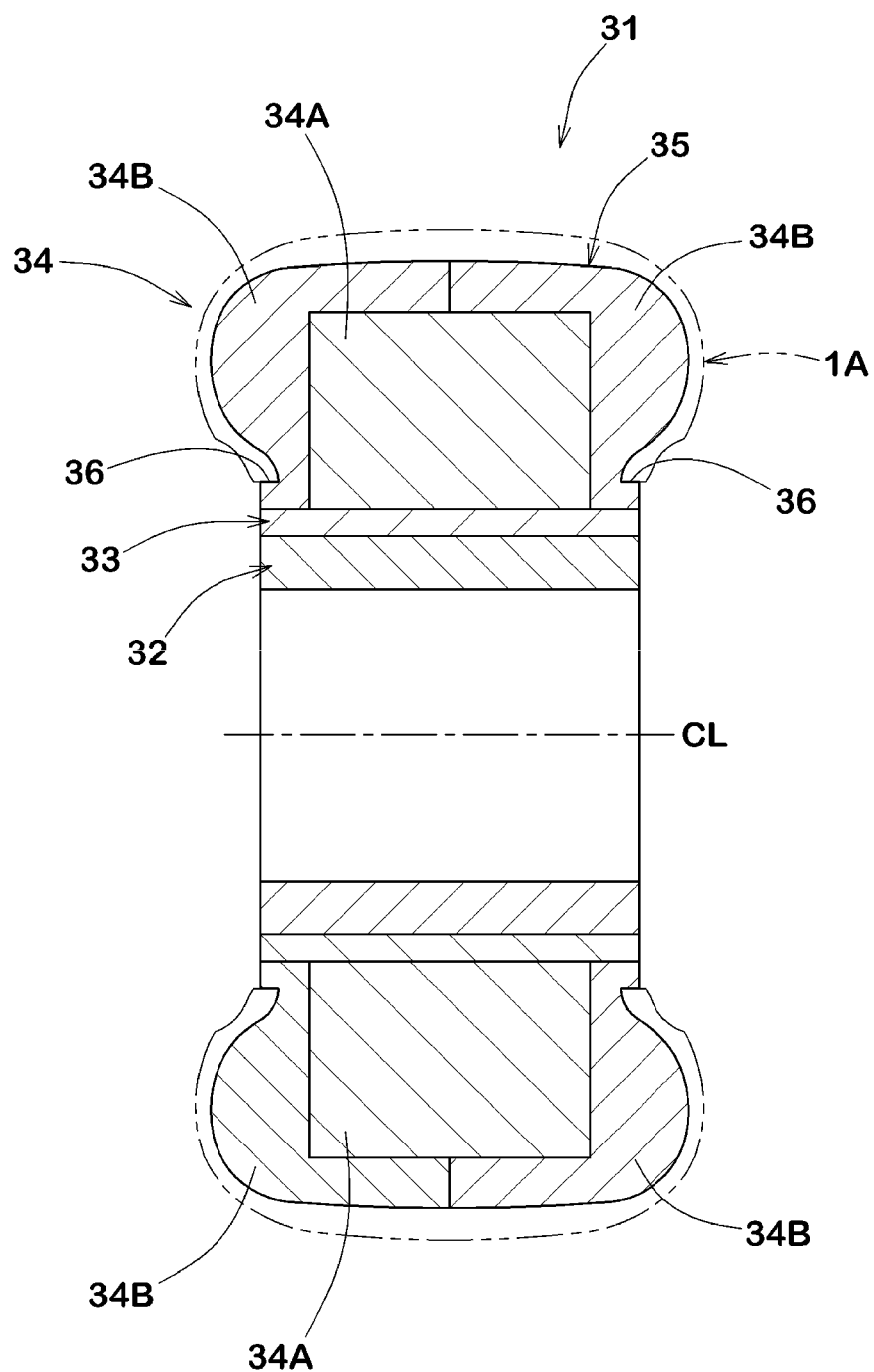
FIG. 7 is a cross sectional view of a core used in a producing method of the pneumatic tire of the invention.

As shown in FIG. 7, the tire 1 of this embodiment is produced by the producing method including a green tire forming step of forming a non-vulcanized green tire 1A using a green tire-forming core 31, and a vulcanizing step of vulcanizing the green tire 1A together with the core 31.

The core 31 is formed as a so-called assembled core. The assembled core includes an annular inner ring 32 which is coaxial with a tire rotation axis CL, an annular middle ring 33 which is fitted over the inner ring 32, and an annular outer ring 34 which is fitted over the middle ring 33 and can form a tire cavity surface 10 (shown in FIG. 1).

The outer ring 34 includes a core piece 34A which is disposed in a central portion of the outer ring 34, and a pair of left and right divided pieces 34B and 34B disposed on both sides of the core piece 34A such as to cover the core piece 34A. The pieces 34A and 34B are formed substantially continuously in the tire circumferential direction by connecting fan-like segments divided in the tire circumferential direction.

After a toroidal green tire 1A (or tire 1) is formed on an outer side of the core 31, the inner ring 32 and the middle ring 33 are pulled out and removed sequentially in the tire axial direction, the core piece 34A and the divided pieces 34B and 34B are sequentially pulled out and removed from the tire cavity radially inward, and thus the core 31 can easily be disassembled.

The divided piece 34B includes a forming surface 35 which forms an outer surface of the core 31 and can form the tire cavity surface 10, and a pair of bead bottom forming surfaces 36 which are connected to ends of the forming surface 35 on the side of the bead and which project axially outward in a form of a flange.

Figure 8:
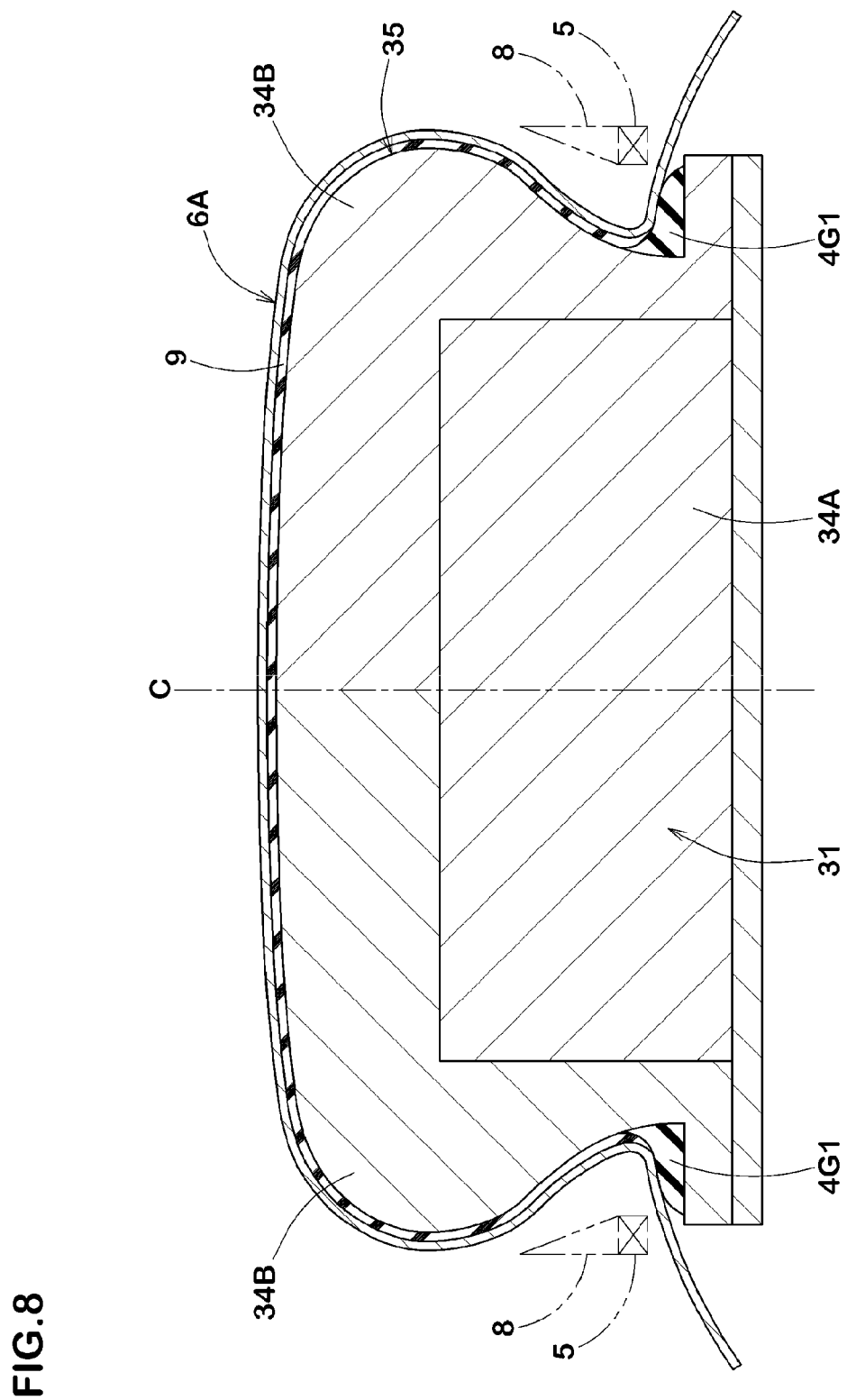
FIG. 8 is an enlarged view of a divided piece thereof.

As shown in FIG. 8, in the green tire forming step, the clinch bottom rubber 4G1 disposed on a contact portion with respect to the rim, the inner liner rubber 9, and the carcass ply 6A are sequentially disposed on the forming surface 35 of the core 31. Rubber portions included in tire members are in a non-vulcanized state. Here, the "non-vulcanized state" includes all states where rubber is not completely vulcanized, and a so-called semi-vulcanized state is included in the "non-vulcanized state".

Figure 9A:
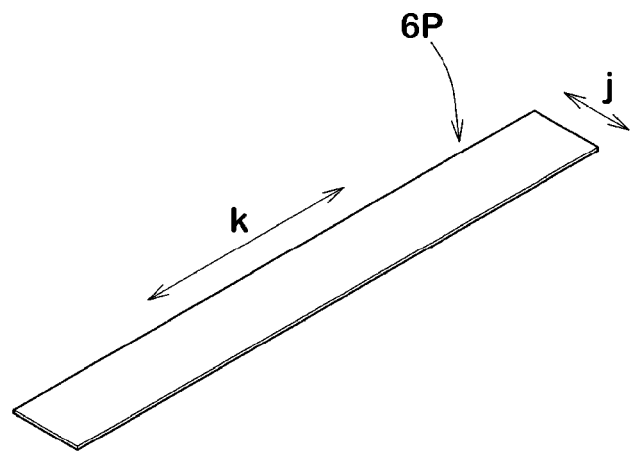
FIG. 9(a) is a development perspective view of a ply piece of a carcass ply.
Figure 9B:
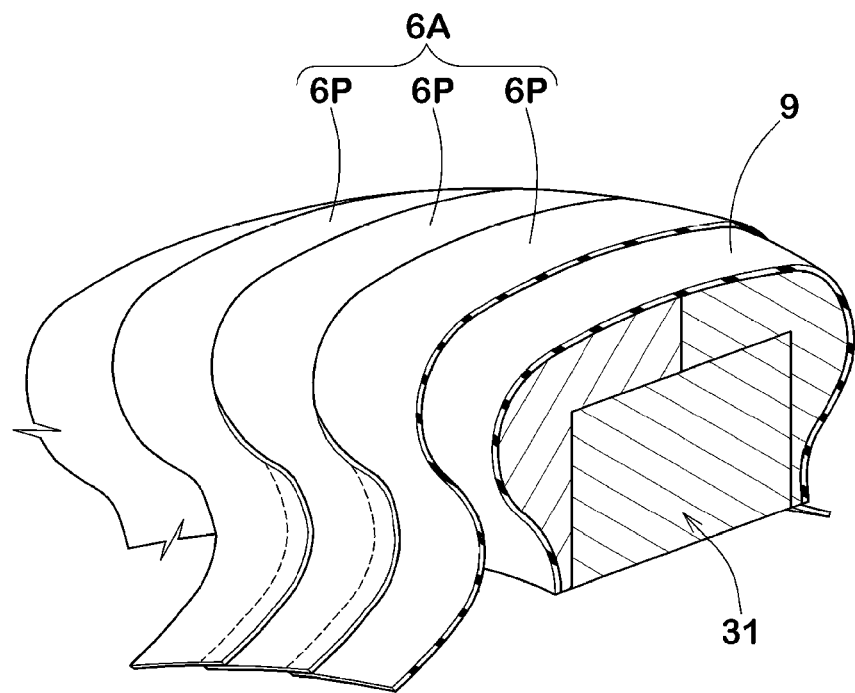
FIG. 9(b) is a perspective view showing a pasting method thereof.

As shown in FIGS. 9(a) and (b), the carcass ply 6A can be formed by butting side lines of strip-like ply pieces 6P having short lengths in the tire circumferential direction j with respect to the length in the tire axial direction k, arranging the ply pieces 6P in the tire circumferential direction, and pasting the ply pieces 6P on the core 31. By superposing the strip-like ply pieces 6P on one another on the side of the bead portion 4, a difference in lengths of the tread portion 2 and the bead portion 4 in the tire circumferential direction can be absorbed, and the toroidal carcass ply 6A can be formed while enhancing its appearance without generating creases.

Figure 10A:
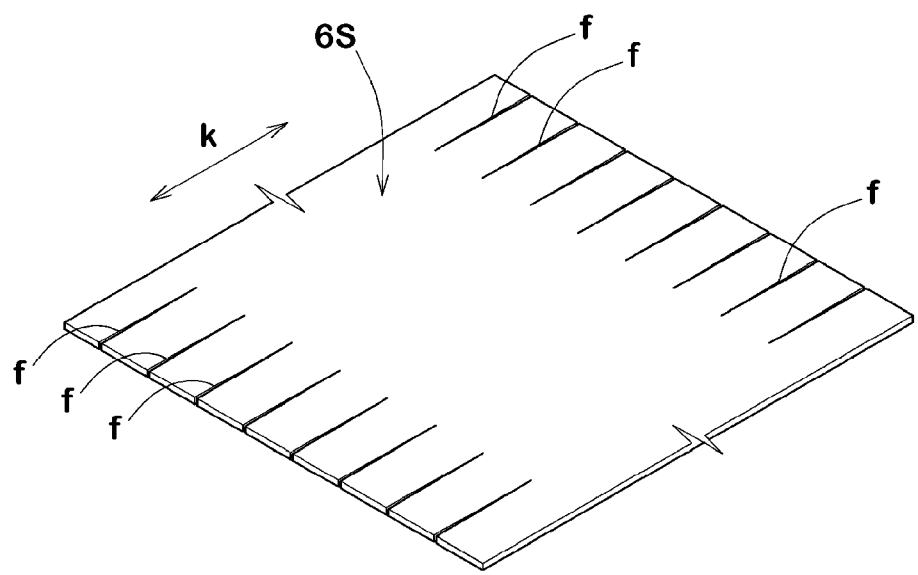
FIG. 10(a) is a development perspective view of the carcass ply.
Figure 10B:
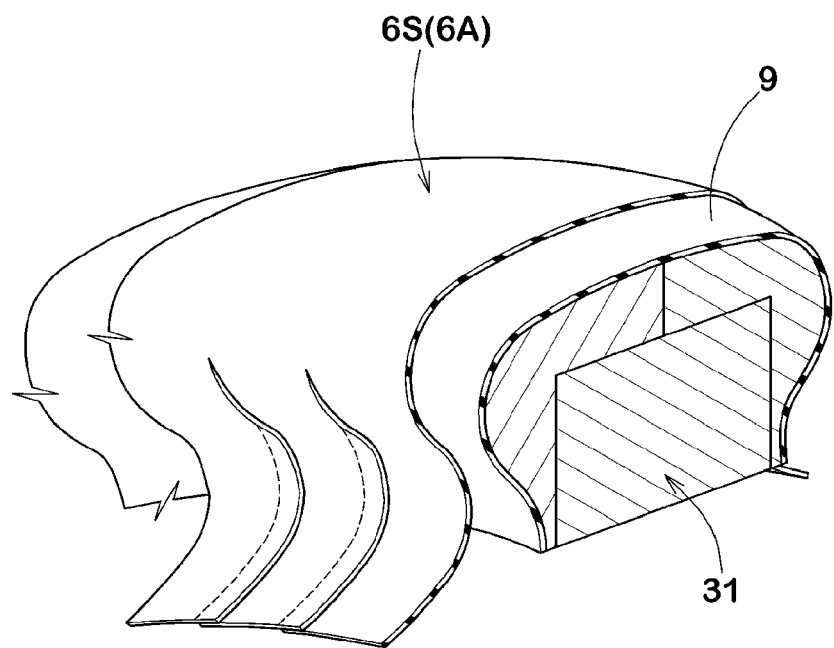
FIG. 10(b) is a development perspective view showing a pasting method thereof.

As shown in FIGS. 10(a) and (b), short slits f extending axially inward of the tire from side edges of a ply 6S in the tire axial direction k are formed in the both side edges of the ply 6S such that the slits f are separated from one another, the ply 6S is wound at least once around the core 31, thereby forming the toroidal carcass ply 6A. In this embodiment also, by superposing, on one another, the ply portions which are divided by the slits f on the side of the bead portion 4, and the toroidal carcass ply 6A can be formed while enhancing its appearance without generating creases.

Next, as shown with phantom lines in FIG. 8, the annular bead cores 5 are fitted to the carcass ply 6A from the sides, and the bead apices 8 are pasted. Thereafter, the carcass ply 6A is wound around the bead cores 5.

Figure 11A:
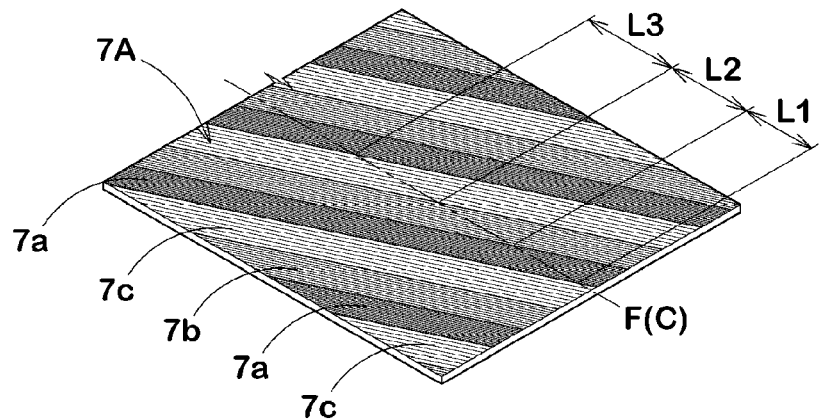
FIG. 11(a) is a perspective view showing a first belt ply.
Figure 11B:
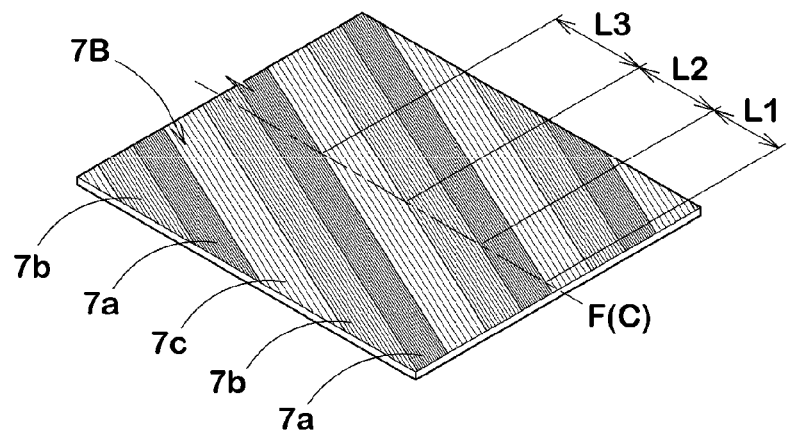
FIG. 11(b) is a perspective view showing a second belt ply.
Figure 11C:
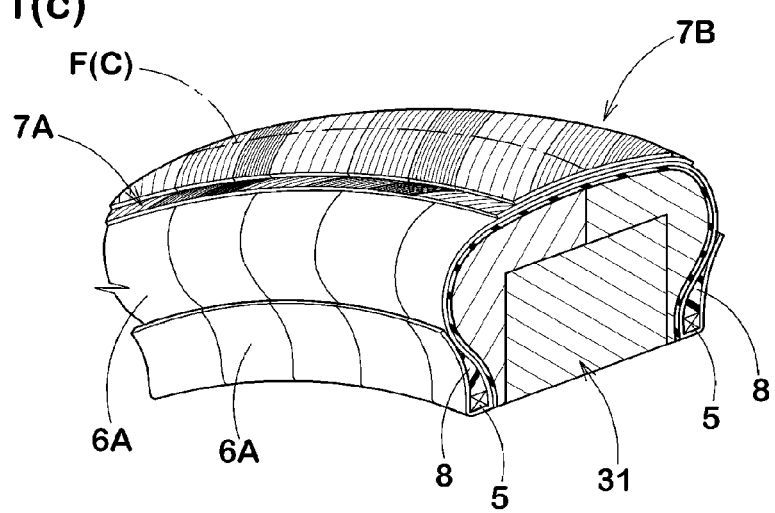
FIG. 11(c) is a perspective view showing a pasting method thereof.

As shown in FIGS. 11(*a*) to (*c*), belt plies 7A and 7B are disposed on the outer side of the carcass 6. The belt plies 7A and 7B of this embodiment are each formed into an annular shape by arranging three kinds of strip-like belt ply pieces 7*a*, 7*b*, and 7*c* in the tire circumferential direction and connecting them. The belt ply pieces 7*a*, 7*b*, and 7*c* are formed into a substantial parallelogram having different arranging densities (arranging densities NL, NM, and NS) of the belt cords 15 and different lengths L1, L2, and L3 (L1<L2<L3) in the tire circumferential direction at ply width center positions F corresponding to the tire equator C. The belt ply pieces 7*a*, 7*b*, and 7*c* are disposed in correspondence with arrangements of the pitches PS, PM, and PL of the center block line 14A.

Figure 12:
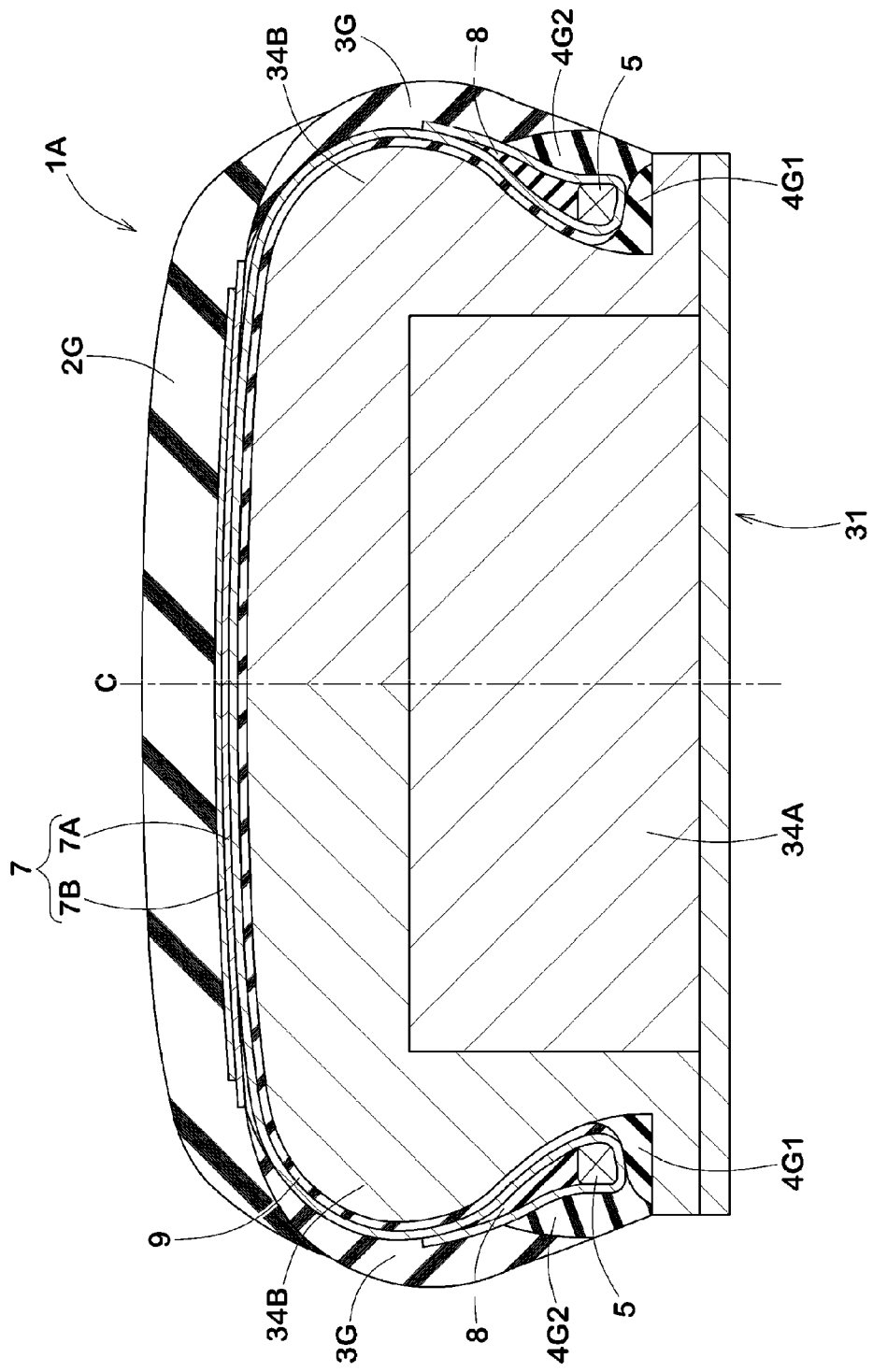
FIG. 12 is a cross sectional view for explaining a green tire forming step.

Thereafter, as shown in FIG. 12, clinch side rubbers 4G2, sidewall rubbers 3G, and a tread rubber 2G are pasted on outer sides thereof. With this configuration, the green tire 1A is formed on the outer side of the core 31 and then, the vulcanizing step is carried out.

Figure 13:
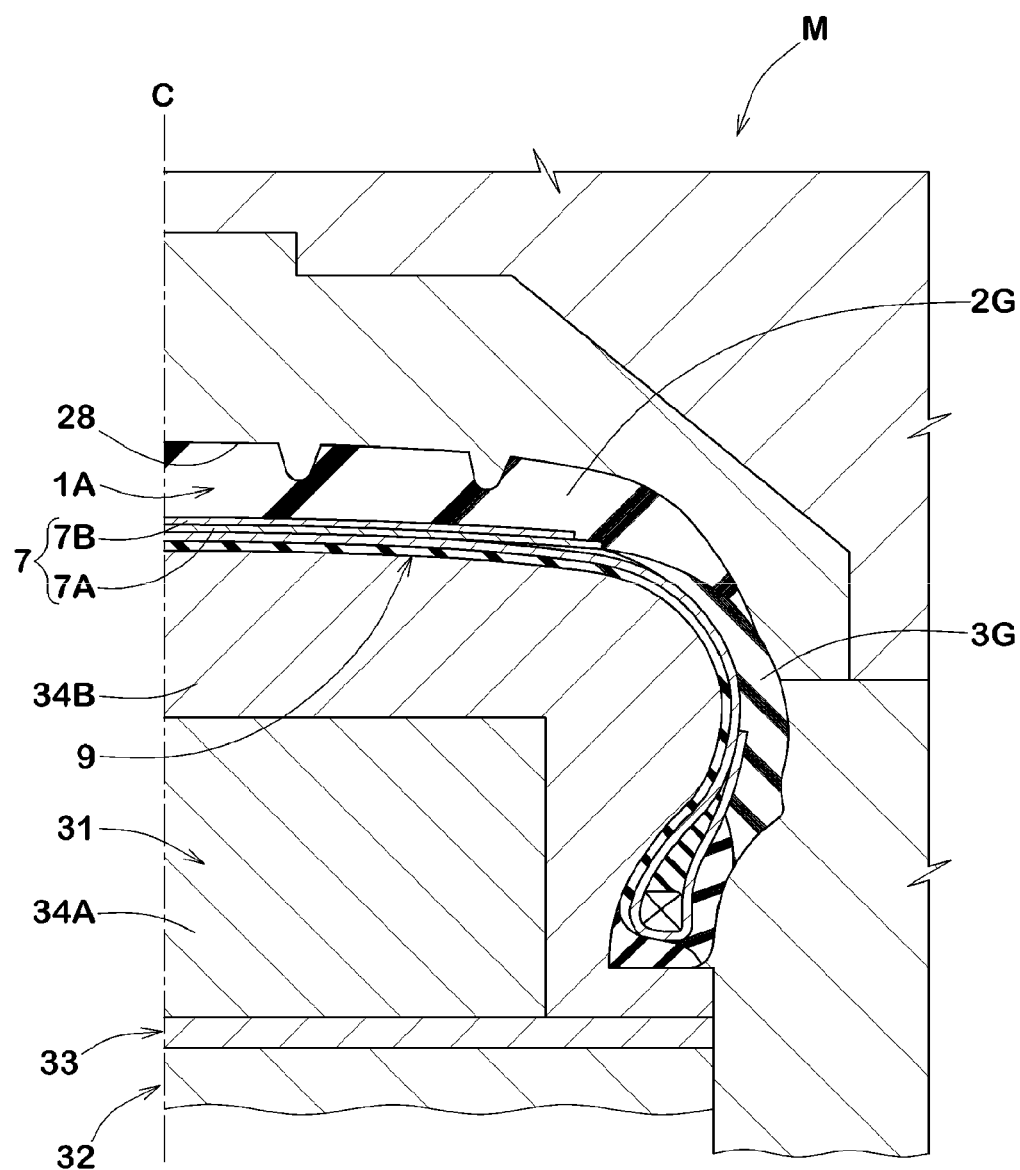
FIG. 13 is a cross sectional view for explaining a vulcanizing step.

FIG. 13 is a cross sectional view during the vulcanizing step. A vulcanizing mold M includes a divided mold which can be divided in the tire radial direction and the tire axial direction. The vulcanizing mold M is provided therein with a cavity into which the green tire 1A and the core 31 can be inserted. In the vulcanizing step of this embodiment, the green tire 1A and the core 31 are placed in the vulcanizing mold M.

The green tire 1A and the vulcanizing mold M are positioned and vulcanized such that the large pattern-constituting unit 21C having the large pitch PL is formed on the outer side of the strip-like belt ply piece 7*a* of the small arranging density NS, and the small pattern-constituting unit 21A having the small pitch PS is formed on the outer side of the strip-like belt ply piece 7*c* of the large arranging density NL (intermediate pattern-constituting unit 21B of a pitch PM is formed on the outer side of the belt ply piece 7*b* of the arranging density NM). Such a positioning can easily be carried out by setting reference positions of arrangements of the belt ply pieces 7*a* to 7*c* on the surface of the tread rubber 2G for example.

Thereafter, the vulcanizing mold M is heated. This plasticizes the rubber portions of the green tire 1A, and the rubber portions are vulcanized and formed along a forming surface 28 of the vulcanizing mold M and the forming surface 35 of the core 31. After the vulcanizing step is completed, the tire 1 is taken out from the vulcanizing mold M together with the core 31. The core 31 is then disassembled, and the pneumatic tire 1 having the tread portion 2 as shown in FIG. 2 can be produced.

Although the preferred embodiment of the present invention has been described in detail, the invention is not limited to the illustrated embodiment and the invention can variously be deformed and carried out. In the embodiment, the numbers of kinds of the pitches of the tread pattern and kinds of the arranging densities of the belt cords may be different from each other. For example, the number of kinds of the pitches of the pattern-constituting unit may be five, and the number of kinds of the arranging densities of the belt cords may be two. In this case, it is preferable that the arranging density of the belt cords 15 is set relatively large (dense) only when the pitch is the minimum.

EXAMPLES

Pneumatic tires were prototyped under specifications shown in Table 1, and performance tests were conducted about them. Common specifications are as follows:

Tire size: 215/60R16
Rim size: 16×6.5J
Vehicle: 4WD vehicle having displacement of 3000 cc When a tread pattern is as shown in FIG. 6, dense and thin arrangement of belt cords is applied to the land line 18B (pitch line) on the side of a shoulder located outside of the vehicle. When a tread pattern is as shown in FIG. 3, dense and thin arrangement of belt cords is applied to the center block line 14A (pitch line). Pitches of the pattern-constituting unit of the pitch line are as follows:

Pitch A: 75.0 mm
Pitch B: 87.5 mm
Pitch C: 100.0 mm
Pitch D: 112.5 mm
Pitch E: 125.0 mm The pitch arrangement is as follows:

Pitch arrangement: C C E E E C B B A C B D D C B C C D E C A A A A B A C E D D D C A A B B C D C D E E C B A C D D E C A C B A Arranging densities of the belt cords on the inner sides of the pitches are as follows:

Comparative Example 1

Five Kinds of Pitches, One Kind of Arranging Density

Belt cords were uniformly arranged on the inner sides of all of pitches at arranging density of 35/cm.

Examples 1 and 2

Five Kinds of Pitches and Five Kinds of Arranging Densities

Arranging density of 41/cm on the inner side of pitch A
Arranging density of 38/cm on the inner side of pitch B
Arranging density of 35/cm on the inner side of pitch C
Arranging density of 32/cm on the inner side of pitch D
Arranging density of 29/cm on the inner side of pitch E Examples 3 and 4

Five Kinds of Pitches and Three Kinds of Arranging Densities

Arranging density of 41/cm on the inner side of pitch A
Arranging density of 41/cm on the inner side of pitch B
Arranging density of 35/cm on the inner side of pitch C
Arranging density of 29/cm on the inner side of pitch D
Arranging density of 29/cm on the inner side of pitch E Examples 5 and 6

Five Kinds of Pitches and Two Kinds of Arranging Densities

Arranging density of 41/cm on the inner side of pitch A
Arranging density of 41/cm on the inner side of pitch B
Arranging density of 29/cm on the inner side of pitch C
Arranging density of 29/cm on the inner side of pitch D
Arranging density of 29/cm on the inner side of pitch E
The test methods are as follows.

Example 7

Five Kinds of Pitches and Five Kinds of Arranging Densities

Arranging density of 45/cm on the inner side of pitch A
Arranging density of 40/cm on the inner side of pitch B
Arranging density of 35/cm on the inner side of pitch C
Arranging density of 30/cm on the inner side of pitch D
Arranging density of 25/cm on the inner side of pitch E

Example 8

Five Kinds of Pitches and Five Kinds of Arranging Densities

Arranging density of 43/cm on the inner side of pitch A
Arranging density of 39/cm on the inner side of pitch B
Arranging density of 35/cm on the inner side of pitch C
Arranging density of 31/cm on the inner side of pitch D
Arranging density of 27/cm on the inner side of pitch E

Example 9

Five Kinds of Pitches and Five Kinds of Arranging Densities

Arranging density of 39/cm on the inner side of pitch A
Arranging density of 37/cm on the inner side of pitch B
Arranging density of 35/cm on the inner side of pitch C
Arranging density of 33/cm on the inner side of pitch D
Arranging density of 31/cm on the inner side of pitch E <Anti-Uneven Wear Performance>

Prototyped tires were mounted to front wheels of the vehicle, and the vehicle was made to run on a test course for 300 km in a mode in which cornering, braking, and driving were combined. After the test running, a wear amount of each pattern-constituting unit was measured with respect to the land line (pitch line) on the side of a shoulder located on an outer side of the vehicle in a case where a tread pattern were as shown in FIG. 6, and the center block line (pitch line) in a case where the tread pattern was as shown in FIG. 3. Reciprocals of average values of the differences are shown with indices in which that of a comparative example is determined as 100. The greater the numerical value is, the higher the anti-wear performance is.

<Noise Performance>

Prototyped tires were mounted to all of wheels of the vehicle, the vehicle was made to run on a smooth road surface at 50 km/H, and magnitude of pitch noise was evaluated by driver's feeling. Results are shown with points in which the magnitude of pitch noise of the comparative example is determined as 100. The greater the numerical value is, the smaller the pattern noise is.

<Traction Performance>

Prototyped tires were mounted to front wheels of the vehicle, and the vehicle was made to run on a test course, and time at the time of starting that was elapsed until the vehicle runs for 100 m from its stationary state was measured ten times. Reciprocals of average values of them are shown with indices in which that of a comparative example is determined as 100. The greater the numerical value is, the higher the traction performance is.

Test results are shown in Table 1.

TABLE 1

| | Comparative example | Example 1 | Example 2 | Example 3 | Example 4 | Example 5 | Example 6 | Example 7 | Example 8 | Example 9 |
|---|---|---|---|---|---|---|---|---|---|---|
| Shape of tread pattern | FIG. 6 | FIG. 6 | FIG. 3 | FIG. 6 | FIG. 3 | FIG. 6 | FIG. 3 | FIG. 3 | FIG. 3 | FIG. 3 |
| Total number of pitches of pattern-constituting unit | 5 | 5 | 5 | 5 | 5 | 5 | 5 | 5 | 5 | 5 |
| Number of kinds of arranging densities of belt cords | 1 | 5 | 5 | 3 | 3 | 2 | 2 | 5 | 5 | 5 |
| Arranging density NL in the smallest pitch (number/cm) | 35 | 41 | 41 | 41 | 41 | 41 | 41 | 45 | 43 | 39 |
| Arranging density NS in the largest pitch (number/cm) | 35 | 29 | 29 | 29 | 29 | 29 | 29 | 25 | 27 | 31 |
| Ratio (NL/NS) | 1.00 | 1.41 | 1.41 | 1.41 | 1.41 | 1.41 | 1.41 | 1.80 | 1.59 | 1.26 |
| Anti-wear performance (index) | 100 | 115 | 107 | 109 | 105 | 105 | 103 | 110 | 110 | 104 |
| Noise performance (point) | 100 | 108 | 106 | 106 | 105 | 103 | 103 | 107 | 107 | 103 |
| Traction performance (index) | 100 | 102 | 110 | 102 | 107 | 101 | 103 | 113 | 112 | 109 |

As results of the tests, it could be confirmed that the anti-uneven wear performance and the traction performance of the pneumatic tires of the examples were enhanced. By improving the arrangement of the belt cords, pitch noise could be reduced.

The invention claimed is:

1. A pneumatic tire comprising a toroidal carcass extending from a tread portion to a bead core of a bead portion through a side wall portion, and a belt layer including at least one belt ply which is disposed on an outer side of the carcass in a radial direction of the tire and inside of the tread portion, in which belt cords are arranged at an angle of 10 to 40° with respect to a tire equator, wherein a tread pattern formed on a surface of the tread portion includes a pitch line in which at least two kinds of pattern-constituting units having different pitches in a circumferential direction of the tire are arranged in the circumferential direction of the tire, and the belt cords are arranged relatively densely on an inner side of the pattern-constituting unit having a small pitch, and are arranged relatively thinly on an inner side of the pattern-constituting unit having a large pitch.

2. The pneumatic tire according to claim 1, wherein the pitch line is arranged on the tire equator.

3. The pneumatic tire according to claim 1, wherein the pitch line is arranged on a side closest to a ground-contact end.

4. The pneumatic tire according to claim 3, wherein the tread portion includes a tread pattern having a directivity in which a mounting direction thereof with respect to a vehicle is specified, and the pitch line is located on the outer side of the vehicle when the pneumatic tire is mounted to the vehicle.

5. The pneumatic tire according to any one of claims 1 to 4, wherein the pitch line is a block line in which the pattern-constituting units including one lateral groove and one block which is adjacent to the lateral groove on one side of the lateral groove in the circumferential direction of the tire are arranged.

6. The pneumatic tire according to any one of claims 1 to 4, wherein the pitch line is a land line in which the pattern-constituting units including one lug groove and one land portion sandwiched between the lug grooves are arranged.

7. The pneumatic tire according to claim 1, wherein a ratio (NL/NS) of an arranging density NL on an inner side of the pattern-constituting unit having the smallest pitch and an arranging density NS on an inner side of the pattern-constituting unit having the largest pitch is 1.20 to 2.00.

8. A producing method of the pneumatic tire according to claim 1, comprising a green tire forming step of forming a non-vulcanized green tire using a core for forming an annular green tire, and a vulcanizing step of vulcanizing the green tire by a vulcanizing mold having a forming surface in which the tread pattern is reversed, wherein the green tire forming step includes a step of forming the belt ply while arranging, in a circumferential direction of the tire, at least two kinds of strip-like belt ply pieces having different arranging densities of the belt cords, and in the vulcanizing step, a forming surface which forms the pattern-constituting unit having a large pitch on an outer side of the strip-like belt ply piece having a small arranging density, and a forming surface which forms the pattern-constituting unit having a small pitch on an outer side of the strip-like belt ply piece having a large arranging density are positioned and vulcanized.

\* \* \* \* \*